United States Patent [19]

Bogdanski

[11] Patent Number: 4,766,512
[45] Date of Patent: Aug. 23, 1988

[54] DEVICE FOR INSPECTING THE SURFACE OF MAGNETIC MEMORY DISKS

[75] Inventor: Michael Bogdanski, Salzkotten, Fed. Rep. of Germany

[73] Assignee: Nixdorf Computer AG, Paderborn, Fed. Rep. of Germany

[21] Appl. No.: 811,108

[22] Filed: Dec. 19, 1985

[30] Foreign Application Priority Data

Dec. 21, 1984 [DE] Fed. Rep. of Germany ....... 3446991

[51] Int. Cl.⁴ .............................................. G11B 5/012
[52] U.S. Cl. ....................................... 360/137; 360/98
[58] Field of Search ...................... 356/237, 241, 371; 369/58, 292, 44, 45; 250/572; 360/86, 97–99, 104–106, 103, 128, 135, 137

[56] References Cited

U.S. PATENT DOCUMENTS

| 3,413,067 | 11/1968 | Froio .................................... 356/241 |
| 3,734,626 | 5/1973 | Roberts et al. .................. 356/237 X |
| 4,004,081 | 1/1977 | Zorn .................................. 369/44 X |
| 4,493,554 | 1/1985 | Pryor et al. .......................... 356/241 |
| 4,561,776 | 12/1985 | Pryor .............................. 356/241 X |
| 4,669,073 | 5/1987 | Wakabayashi et al. ............... 369/45 |

FOREIGN PATENT DOCUMENTS

| 58-115310 | 7/1983 | Japan .................................. 356/237 |
| 59-148807 | 8/1984 | Japan .................................. 356/371 |

OTHER PUBLICATIONS

Brew et al., "Disk Inspection Apparatus", IBM Tech. Disc. Bull., vol. 20, No. 5, Oct. 1977.

Primary Examiner—Stuart N. Hecker
Assistant Examiner—Benjamin E. Urcia
Attorney, Agent, or Firm—Cullen, Sloman, Cantor, Grauer, Scott & Rutherford

[57] ABSTRACT

For the inspection of magnetic memory disks (11) a viewing arrangement (17,18,19) is used which can be mounted on the head arm carrier (16) of a magnetic disk memory in place of one or more head arms. It has a bracket (19) which can be moved between the magnetic memory disks (11) and on which is provided the light admission part or optical pickup of the viewing arrangement (17,18,19). The image received by the pickup (20) is conducted to the part of the viewing arrangement (17,18,19) which is located outside of the magnetic memoryt disks (11) on the head arm carrier (16). There the disk surface can conveniently be inspected.

5 Claims, 3 Drawing Sheets

DEVICE FOR INSPECTING THE SURFACE OF MAGNETIC MEMORY DISKS

FIELD OF THE INVENTION

The invention relates to a device for inspecting the surface of magnetic memory disks in a magnetic disk memory which contains a read/write head assigned to one of the respective magnetic memory disks, which head is held on a head arm which is movable parallel to the plane of the magnetic memory disk and is arranged on a head arm carrier.

BACKGROUND OF THE INVENTION

Generally, magnetic memory disks in a disk memory device are arranged as a stack of disks and serve for storing data items on memory tracks which run concentrically to one another and to the axis of rotation of the stack of disks. The tracks are each scanned by an electromagnetic transducer head for carrying out a write or read process. The transducer head is held on the head arm, and the latter can be positioned on the individual magnetic memory tracks by the head arm carrier coupled with a drive by having the head arm either swung parallel to the magnetic memory disk or moved out in a radial direction. For this the transducer head is suspended with a small spacing above or below the respective magnetic memory disk. Two transducer heads are provided for each magnetic memory disk, which heads are moved over or under the magnetic memory disk on their head arm so that the disk is usable as double sided. If a number of magnetic memory disks are provided, then a corresponding number of transducer heads are held one over another in the manner of a stack on the head arm carrier common to them.

Due to various environmental influences, especially by contaminations or unintentional contact between the transducer heads and the magnetic memory disks, the surfaces of the latter can be damaged over long periods of use. Because of this it is advisable to inspect the magnetic memory disks so that they can be replaced when their magnetic coating medium is too greatly impaired. Previously for this purpose the magnetic memory disks had to be removed from the magnetic disk memory and subjected to optical inspection, which in some cases might cause further impairment or damages. In particular, centering defects can occur in this way, avoiding which would require a relatively large expenditure of work in reinstalling the magnetic memory disks.

SUMMARY OF THE INVENTION

It is the problem of the invention to provide a capability of inspecting the surface of the magnetic memory disks which avoids any tedious removal and reinstallation of the magnetic memory disks so that this expenditure of work can be saved in the course of the service life of a magnetic memory disk.

A device of the type mentioned at the start for solving this problem is characterized according to the invention by a viewing arrangement which can be mounted on the head arm carrier in place of one or more head arms and which includes at least one bracket extending substantially parallel to the plane of the magnetic memory disks, on which bracket its light receiving or admitting part (optical pickup) is arranged.

The invention is based on the idea that during inspection of magnetic memory disks there is a pause in the operation of the magnetic disk memory in which the electromagnetic transducer heads are not used, so that a viewing arrangement for the optical inspection of the disk surface can be inserted in place of the heads. For this the head arms are taken off the head arm carrier and the viewing arrangement is placed on the head arm carrier. The viewing arrangement with its bracket can then be swung or moved between the magnetic memory disks just like a head arm, so that the neutral drive of the head arm carrier can be used for this. Since the optical pickup of the viewing arrangement is provided on the bracket, the magnetic memory disk's surface is viewed directly with this, and through the rotation of the latter the whole of it can be inspected. For this the viewing arrangement can be mounted outside of the region of the magnetic memory disks directly on the head arm carrier, and only its optical pickup is arranged on the bracket, so that the latter can conveniently be introduced into the relatively small intermediate space between the magnetic memory disks. With the guiding of light from the bracket to the further part of the viewing arrangement arranged outside of the magnetic memory disks, a light deflection can advantageously be coupled in such a way that a simple viewing of any place on the magnetic disk memory is possible at the eyepiece of the viewing arrangement which place is easily accessible from the outside.

The most varied optical elements can be used for the admission and guiding of light along the bracket, but a construction which has proven particularly simple and advantageous is one in which the optical pickup provided on the free end of the bracket is an observation mirror and if necessary a deviation mirror arrangement for deflecting the observed image into a viewing arrangement arranged on the arm of the bracket. For this a deviation mirror arrangement is required when the observation mirror does not directly reflect to this arm in the lengthwise direction of the bracket.

It is advantageous for the observation mirror to be a rectangular prismatic mirror. Such a mirror is a unit glass part the outer surfaces of which standing at a right angle to each other are mirror-coated or metallized. If this prismatic mirror is arranged with an apex edge lying parallel to the magnetic memory disks, then parts of two magnetic memory disks between which the prismatic mirror is arranged can be viewed at the same time.

It is possible to arrange the observation mirror with its lengthwise extent in the lengthwise direction of the bracket or transverse to this. When it is aligned in the lengthwise direction of the bracket, then it is approximately in a radial direction to the axis of rotation of the magnetic memory disks, and a ring-shaped area of the respective magnetic memory disk with a width corresponding to its lengthwise extent is inspected during one rotation. For this it is advantageous then to provide a convexly curved deviation mirror reflecting the image detected to the viewing apparatus, which mirror then acts as a reducing mirror and reduces the dimensions of the reflected image in such a way that it fits the objective opening of the viewing apparatus.

When the observation mirror is arranged with its lengthwise extent transverse to the bracket, then it can reflect directly to the viewing apparatus, but then a relatively narrow circular ring of the surface of the magnetic memory disk can be inspected, so that the bracket must often be shifted for inspecting the whole magnetic memory disk surface.

When a deviation mirror is arranged in the region of the arm of the bracket which mirror deflects the image coming from the observation mirror into the viewing apparatus, then the latter can be arranged with its optical axis vertical, so that then a particularly convenient inspection of the surfaces of the magnetic memory disks from above is possible.

It is advantageous for the viewing arrangement to be mounted on the head arm carrier so as to be adjustable in the direction of the memory disk axis. Then only a single bracket need be provided which can be moved into one after another of the intermediate spaces between two respective magnetic memory disks of a stack of disks.

DETAILED DESCRIPTION OF THE PREFERRED EMBODIMENT

Figure 1:
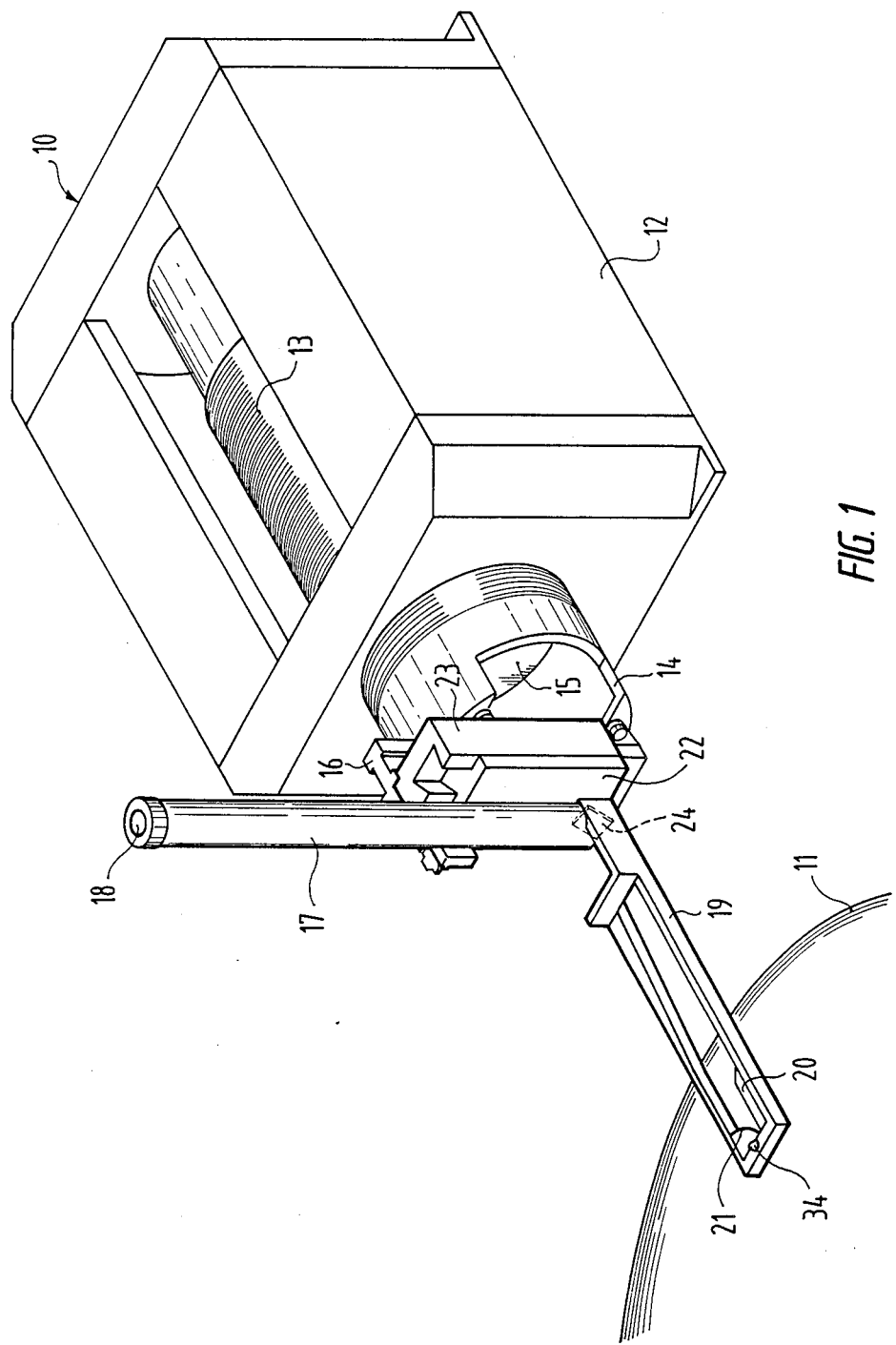
FIG. 1 shows a perspective representation of a head arm carrier which can be moved in a magnetic disk memory radially to the magnetic memory disks with a viewing arrangement mounted on it.

In FIG. 1 and electrodynamic linear drive 10 is represented in a perspective view, which in a magnetic disk disk memory is assigned to a magnetic memory disk 11 which is only partially denoted and which in a box-like case 12 contains a cylindrical drive member 14 provided with an electrical coil 13. This member is moved concentrically on an iron core 15 and in an intrinsically known manner is moved out of the case 10 or into this by the generation of an electrodynamic effect in order to move a head arm with an electromagnetic transducer held on it normally into a magnetic memory disk 11. For this purpose a head arm carrier 16 is fastened on the outer end of the driving cylinder 14, which carrier is designed in a manner, not represented, such that it can carry one or more head arms which are aligned in the lengthwise direction of the drive cylinder 14.

A drive device of this type is known in itself and operates by the already known principle of radial head motion.

A viewing arrangement is mounted on the head arm carrier 16 in place of one or more head arms in the device shown in FIG. 1. This includes as its essential parts a viewing apparatus 17 which for sake of simplicity is represented in FIG. 1 as a tubular part and at its top end has an eyepiece 18 or an attachment for putting on an eyepiece, not further represented. In the region of its lower end there is an objective, not represented, the location of which within the viewing apparatus 17 is not of particular importance here.

The viewing apparatus 17 together with a bracket 19 is made essentially like a frame and carries on its free end an observation mirror 20 and a deviation mirror 21. Besides this there is a light source 34 to be seen, which is mounted on the outermost end of the bracket 19. The bracket 19 and the viewing apparatus 17 are fastened onto a guide member 22 in a manner not represented in detail, which member is movable in a vertical direction and for this purpose is provided with a guide part with a dovetail shape which is seated in a correspondingly dovetail-shaped guide channel of a retaining part 23 which is mounted on the head arm carrier 16.

Below the viewing apparatus 17 a deviation mirror 24 is arranged on the bracket 19, which mirror reflects an image of the surface of the magnetic memory disk 11, which is received by the observation mirror 20 and reflected on the deviation mirror 21 to the objective opening, not seen in FIG. 1, of the viewing apparatus 17.

When the drive cylinder 14 is moved out of the case 10, the bracket 19 with the observation mirror 20 held on its is moved radially to the magnetic memory disk 11, so that with a rotation of the magnetic memory disk 11 a circular ring-shaped segment of its surface can be inspected in different radial positions one after another with the viewing apparatus 17 by viewing the corresponding image through the eyepiece 18 from above.

The guide part 22 and the holding part 23 make possible a vertical shifting of the viewing arrangement so that the bracket 19 can be positioned at various height positions in a magnetic disk memory, and thus an inspection of all the disk surfaces in a plurality of magnetic memory disks is possible.

Figure 2:
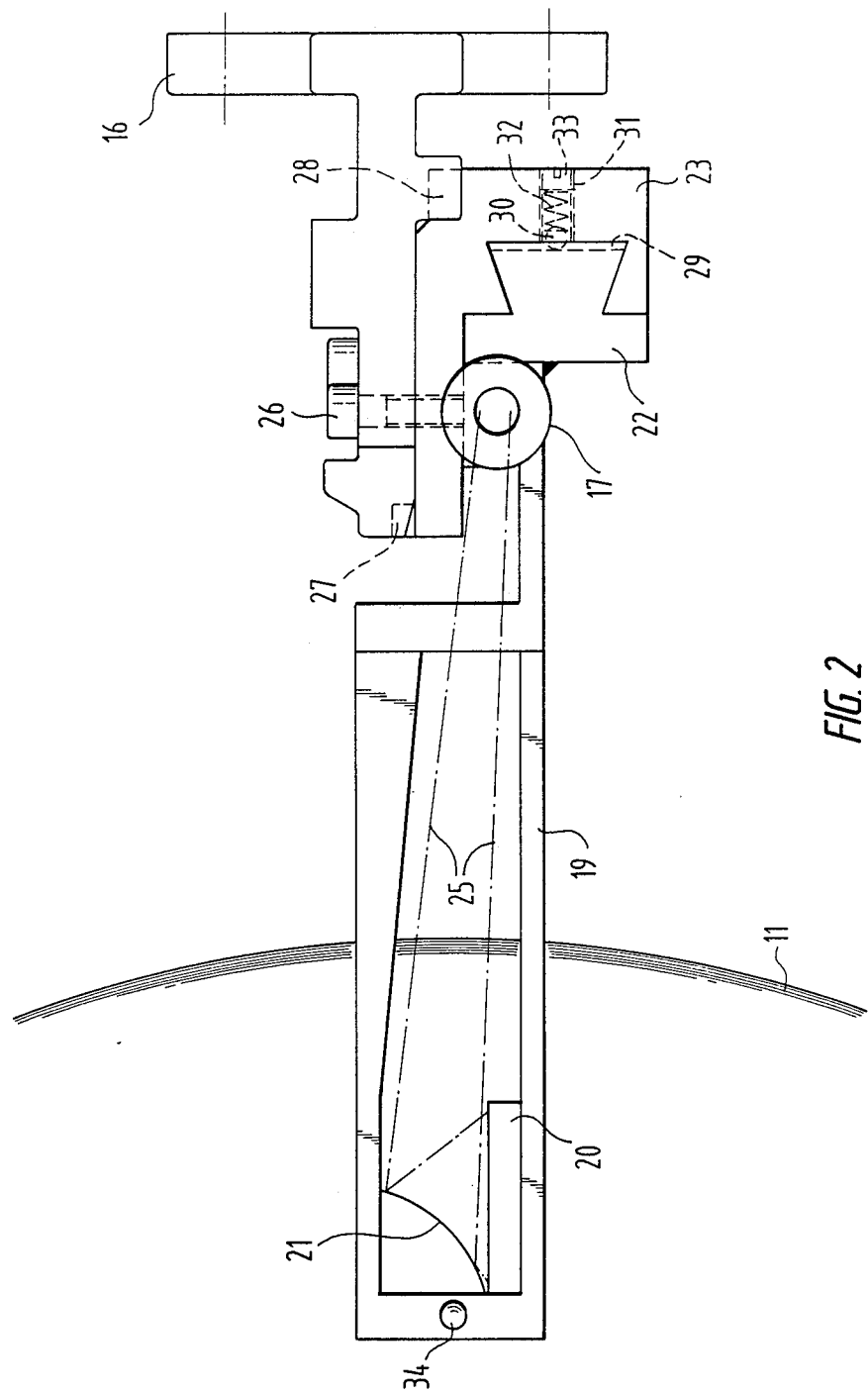
FIG. 2 shows a top plan view of the most important parts of the viewing arrangement and its mounting.

FIG. 2 shows the viewing arrangement represented in FIG. 1 without the electrodynamic drive in a top plan view. Here in addition, the optical ray path from the observation mirror 20 by way of the convexly curved deviation mirror 21 to the viewing apparatus 17 is denoted by broken lines 25. It may be seen that the light rays 25 converge toward the viewing apparatus 17 and reduce the size of the image received with the observation mirror 20, or fit it to the objective opening of the viewing apparatus 17. Since the observation mirror 20 is arranged with its lengthwise magnetic memory plate 11, a region the shape of an annular ring can be inspected with it by the rotation of the magnetic memory disk 11. For this the magnetic memory disk 11 is illuminated by a light bulb corresponding to the light bulb 34 which is provided on the underside of the bracket 19.

FIG. 2 also clearly shows the dovetail guiding of the two parts 22 and 23 as well as the fitting of the holding part 23 to the shape given the head arm carrier 16. The holding part 23 is mounted on the head arm carrier 16 with bolts, of which a bolt 26 is seen in FIG. 2. Moreover, for further securing the mounting of the holding part 23 on the head arm carrier 16 the utilization of projections or recesses is provided, the shape of which likewise fits that of the holding part 23. Such arrangements are seen at 27 and 28.

The guide member 22 can be locked in the holding part 23 at various vertical positions. For this purpose catch notches 29 are provided on the guide member 22 in which notches the catch ball 30 catches, which ball is seated in a bore 31 on the holding part 23 and in an intrinsically known manner is pressed flexibly (or spring-loaded--Transl.) into the respective catch notch 29. For this purpose a spring 32 is used which is retained in the bore 31 by a bolt 33.

Figure 3:
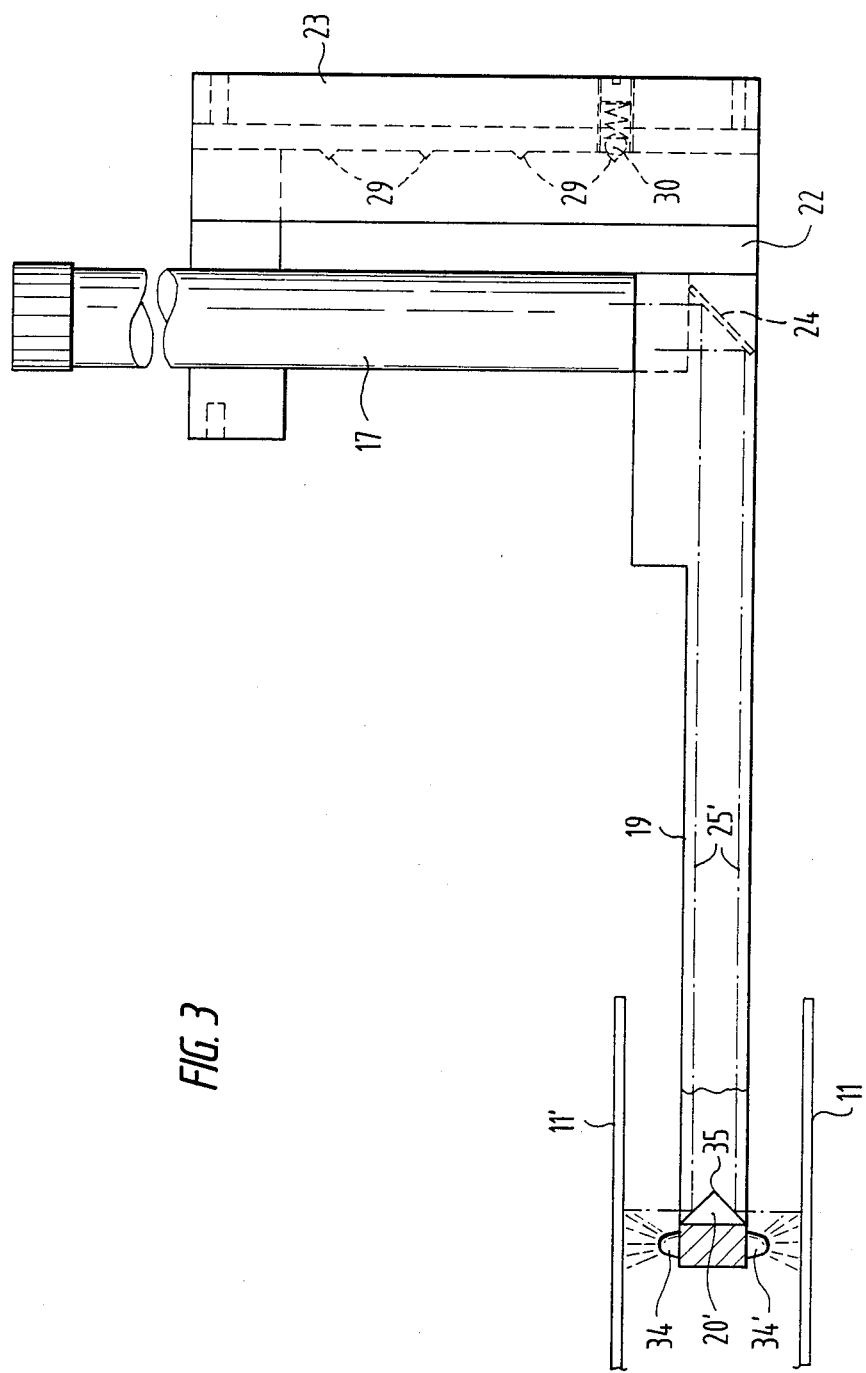
FIG. 3 shows a side view of an arrangement similar to FIGS. 1 and 2, but with a different orientation of the observation mirror.

FIG. 3 shows a side view of the arrangement according to FIG. 2, but for another orientation of the observation mirror, through which its operation can be seen better. Besides this a lower magnetic memory disk 11 and an upper magnetic memory disk 11' are represented, between which the bracket 19 is arranged. The observation mirror 20' here is arranged with its lengthwise extent transverse to the lengthwise extent of the bracket 19 and is designed as a prismatic mirror. Thus it reflects an image of he upper magnetic memory disk 11' and of the lower magnetic mirror 24 on the arm of the bracket 19, which in turn reflects it to the viewing apparatus 17. Corresponding ray paths 25' are denoted in FIG. 3.

It is seen from this that two strip-shaped images can be viewed at the same time with the viewing apparatus 17, which are separated by a line which corresponds to the apex edge 35 of the prismatic mirror 20'.

FIG. 3 also shows the possible locking in different height positions in the vertical positioning of the guide member 22 on the holding part 23, for which the catch notches 20 and the catch ball 30 are provided.

With each of the two possible arrangements of the observation mirror 20 and 20' according to FIGS. 2 and 3, a strip-shaped region of the surface of one or two magnetic memory disks 11 and 11' respectively is inspected, which are illuminated by the respective light sources 34 and 34'. In the arrangement according to FIG. 2, with a rotation of the magnetic memory disk 11, this region is a circular ring with a width corresponding to the length of the observation mirror 20, whereas the arrangement according to FIG. 3 involves a circular ring the width of which corresponds to the width of the observation mirror 20'.

The embodiment examples of the invention explained above can also be readily used in a magnetic disk memory in which the head arms do not move between the magnetic memory disks with a linear drive but rather are swung with a swinging drive between the magnetic memory disks. The type of positioning motion of the observation mirror is not important for the operation of the viewing arrangement.

I claim:

1. A device for manually inspecting the surfaces of magnetic memory disks in a magnetic disk memory which contains a read/write head assigned to a selected one of the respective magnetic memory disks, said head held on a head arm and said head arm arranged on a head arm carrier which is movable parallel to the plane of the selected magnetic memory disk, said device including a plurality of memory disks having surfaces that may be damaged or impaired, means for transmitting an optical image of the surface of a selected disk along a path which is parallel to the surface of said selected disk and parallel to a bracket, said path extending from an optical pickup on said bracket to a viewing apparatus which is angularly positioned relative to said bracket for permitting manual inspection to determine whether the selected disk surface is damaged or impaired, means for mounting said bracket on the head arm carrier in place of the head arm, said bracket extending substantially parallel to the plane of the selected magnetic memory disk, and said means for mounting said bracket on said head arm carrier including means for permitting movement of the bracket in the direction of the axis of the selected magnetic disk, and said bracket being movable such that the surfaces of a plurality of magnetic memory disks may be selectively inspected for damage or impairment without removing the disks from the disk memory.

2. A device as claimed in claim 1 wherein said bracket includes a free end, and the optical pickup is mounted on the free end of the bracket, and said optical pickup includes an observation mirror which interacts with a deviation mirror for deflecting an observed image that is a reflection of the memory disk surface into said viewing apparatus.

3. A device as claimed in claim 2 wherein the observation mirror is a rectangular prismatic mirror.

4. A device as claimed in claim 2 wherein the deviation mirror is a convexly curved mirror.

5. A device as claimed in claim 1 wherein said means for mounting said bracket on said head arm carrier includes a guiding member and a holding member, said guiding member mounting said viewing apparatus and said bracket, and said guiding member being shiftable in the direction of the selected memory disk axis, and means for locking said guiding member at various positions along said holding member.

* * * * *